J. B. SPEED.
ELECTROMAGNETIC DEVICE.
APPLICATION FILED FEB. 12, 1915.

1,202,446.

Patented Oct. 24, 1916.
2 SHEETS—SHEET 1.

Witnesses:
O.D.M. Guthrie
J.E. Rasmussen

Inventor:
James B. Speed.
by A.C. Kennel, Att'y

J. B. SPEED.
ELECTROMAGNETIC DEVICE.
APPLICATION FILED FEB. 12, 1915.

1,202,446.

Patented Oct. 24, 1916.
2 SHEETS—SHEET 2.

Witnesses:
O.D.M. Guthe.
O.E. Rasmussen

Inventor:
James B. Speed.
by A.C. Pannel,
Att'y

UNITED STATES PATENT OFFICE.

JAMES BUCHNER SPEED, OF WEST NEW BRIGHTON, NEW YORK, ASSIGNOR, BY MESNE ASSIGNMENTS, TO WESTERN ELECTRIC COMPANY, INCORPORATED, A CORPORATION OF NEW YORK.

ELECTROMAGNETIC DEVICE.

1,202,446.  Specification of Letters Patent.  Patented Oct. 24, 1916.

Application filed February 12, 1915. Serial No. 7,852.

*To all whom it may concern:*

Be it known that I, JAMES B. SPEED, a citizen of the United States, residing at West New Brighton, in the county of Richmond and State of New York, have invented certain new and useful Improvements in Electromagnetic Devices, of which the following is a full, clear, concise, and exact description.

This invention relates to an electromagnetic device and has for its object the provision of means for translating an alternating current into a form of energy capable of actuating a mechanically operated device.

In accordance with this invention there is provided a magnet system adapted to impart an oscillating movement to an armature upon the passage of an alternating current through said magnet system, the movement of said armature being synchronous, though not necessarily in phase, with the wave of the alternating current. Means are provided for utilizing the oscillations of said armature to accomplish work. These means may comprise a movable member adapted to be held in alternate positions by an applied force, and a flexible connecting means between said oscillating armature and said member adapted in the movement of said armature to overcome the resisting force upon said movable member, whereby said movable member will be moved from one position to the other in such a manner as to deliver sharp, distinct blows or impulses capable of doing work upon a mechanically actuated device.

This invention is illustrated in the accompanying drawings in which—

Figure 1:
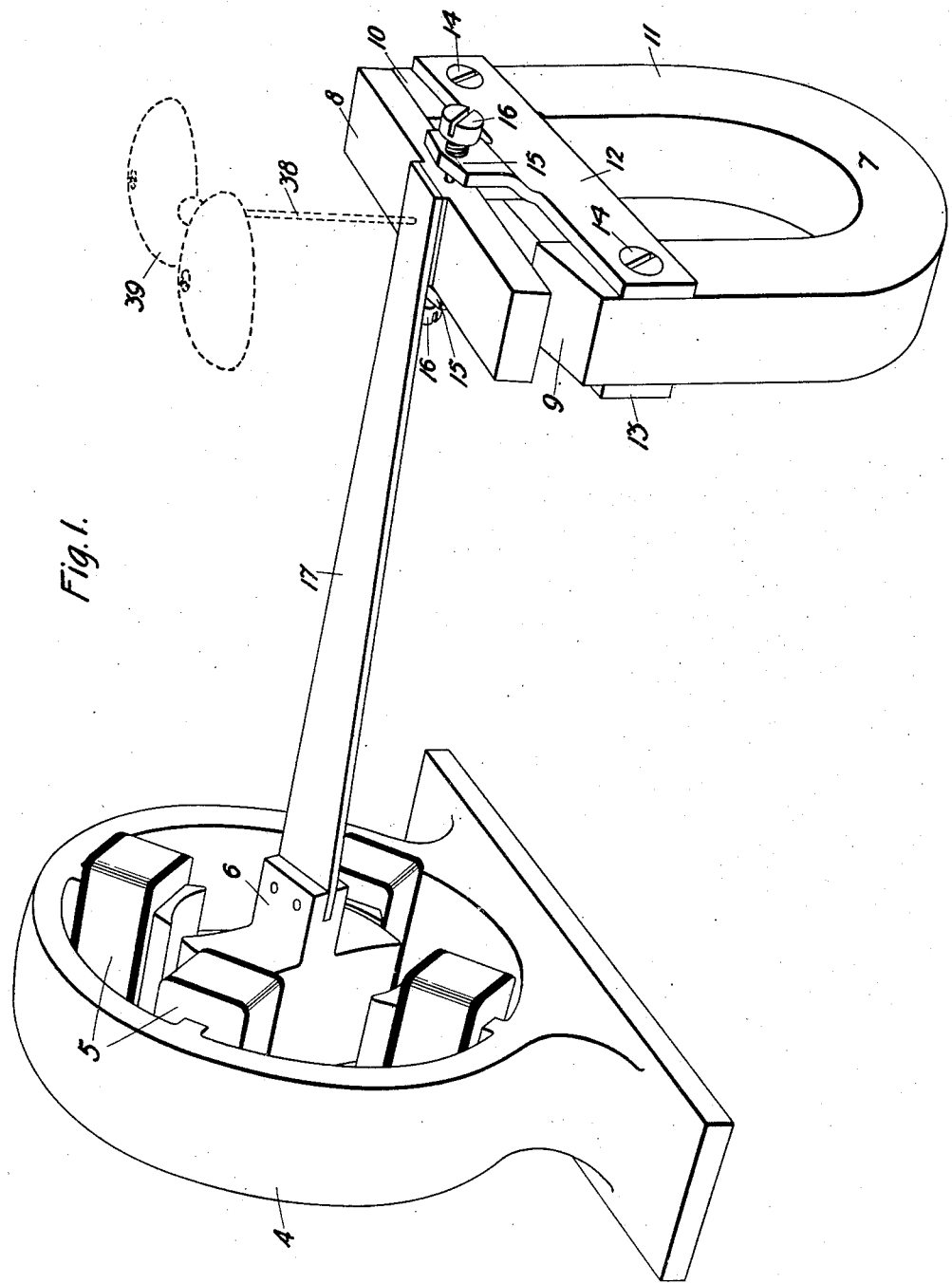
Figure 2:
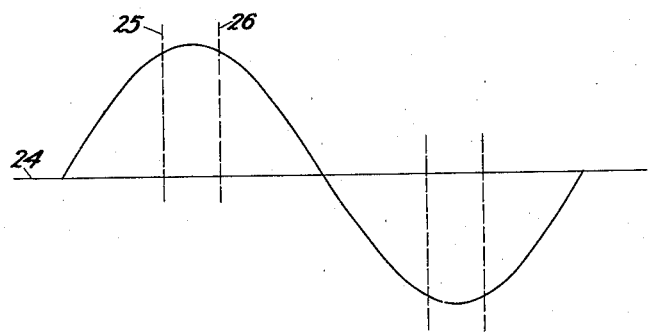

Figure 1 is a perspective view of an alternating current motor and a magnetic device with the armatures thereof connected by means of a flexible member; Fig. 2 represents a smooth sine wave of an alternating current, the area inclosed between the vertical lines being the approximate efficiency derived therefrom; and Fig. 3 illustrates the circuit traversed by an alternating current when the two connected armatures are both actuated by electromagnetic devices.

Apparatus embodying the features of this invention may comprise an alternating current motor 4 having a plurality of field magnets 5 arranged to actuate a polarized armature 6. A second device, which may be either magnetic or electromagnetic, is associated with the motor 4. Fig. 1 discloses a magnetic device 7 having an armature 8 suspended between the poles 9 and 10 of a magnet 11. The armature 8 may be held in this position by any suitable means, such as having a pair of supporting plates 12 and 13 secured by means of screws 14 to opposite sides of the pole pieces 9 and 10 of the magnet 11, in a manner substantially as shown. Each of the supporting plates 12 and 13 is provided with an upwardly extending projection 15, the armature 11 being pivoted between said projection 15 by means of pivot screws 16, 16. As the magnet 11 is a permanent magnet, the armature 8 will be normally attracted by one or the other of the pole pieces 9 and 10. A flexible member 17 connects the armatures 6 and 8, said member being secured to said armatures in any suitable manner.

Figure 3:
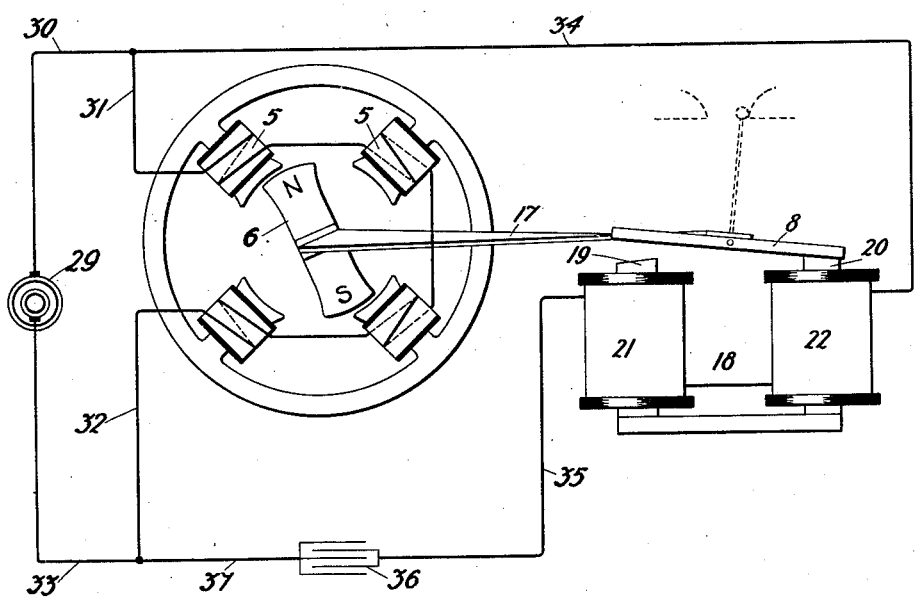

In Fig. 3 there is shown a slight modification of the apparatus illustrated in Fig. 1, said modification consisting in substituting an electromagnetic device 18 in the place of the magnetic device 7. The armature 8 may be supported in operative relation with the pole pieces 19 and 20 of the electromagnets 21, 22 in any satisfactory manner, which will readily suggest itself to those skilled in the art. The electromagnets 21, 22 may be energized from the same source of current as used to energize the field magnets 5 of the motor 4.

The operation of the apparatus described above is as follows: An alternating current of the desired frequency is sent through the field magnets 5 of the motor 4, and the magnetic field created thereby will cause the armature 6 to move, say in a clockwise direction, until the current has reached its maximum value. The current will continue to build up the magnetic field until said current has obtained a maximum value which may be graphically represented by the peak of the sine wave shown in Fig. 2. The magnetic field must attain a given value before the armature 6 is actuated thereby, which point may be represented by the vertical line 25 drawn perpendicular to the base line 24. A corresponding point will be reached during the decrease in the value of the current, which may be represented by a line 26 drawn parallel to the line 25. Now the efficiency derived from the current can be approximately represented by the ratio of the area of the wave curve inclosed between the two vertical lines 25, 26, and the total area inclosed by the corresponding wave curve; where the line 25 intersects the sine wave curve being the instant at which the magnetic field is of sufficient strength to start the movement of the armature 6, and the corresponding point on line 26 being the instant at which said armature reaches the end of its travel.

The armature 6, in its movement will, impart a torque to the flexible member 17, which torque will increase until it reaches a value sufficient to operate the armature 8 by tearing it way from the pole piece attracting it at this particular time, and snap it over upon the other pole piece. This result is accomplished in a vigorous, positive manner so that work may be done upon some mechanism requiring mechanical impulses to actuate the same.

Upon the change in direction of the energizing current the movement of the armature 6 will be gradually decreased until the flexure given to the flexible member 17 is sufficient to overcome the momentum of said armature and bring the same to rest. It may be noted here that the flexure of the flexible member 17 will now start the armature 6 to rotate in a counter clockwise direction, and by virtue of this fact the inertia of said armature will be overcome, so that when the current is of opposite phase said armature will already have been given a rotary motion, which in itself will make the armature 6 more susceptible to the magnetic forces of the field coils 5 when the current is flowing in a reverse direction. The movement of the armature 6 in a counter-clockwise direction is obtained substantially as described above for the movement of said armature in a clockwise direction.

It will be seen that at each cycle of the energizing current, the armature 6 will have made two oscillations, and during each oscillation a place will be reached in the travel of said armature where the torque stored in the flexible member 17 will have reached a value sufficient to overcome the attraction between the armature 8 and its then attracting pole piece, thereby tearing said armature 8 away from said pole piece and snapping it over on to the other pole piece, this being effected each time in a positive manner so that the armature 8 would be capable of delivering a sharp, distinct blow or impulse for each oscillation of the armature 6. It is obvious that these impluses may be used to operate a step by step mechanism such as a selector switch, ringer mechanism, etc. As illustrated by dotted lines in Figs. 1 and 3, a clapper 38 may be mounted upon the armature 8, which may be adapted to strike a pair of gongs 39 upon the actuation of said armature.

Fig. 3 represents diagrammatically apparatus embodying the features of this invention in which the devices used are both electromagnetic devices. Assuming that an alternating current supplied from a generator 29 came in over feed wire 30, it would pass through conductor 31, the windings of magnets 5, conductor 32, feed wire 33, back to generator 29. At the same time a portion of the current would flow through the electromagnetic device 18 over the following circuit: generator 29, feed wire 30, conductor 34, coils of electromagnets 22, 21, conductor 35, condenser 36, conductor 37, feed wire 33, back to generator 29. The purpose of inserting the condenser 36 is to cause the current which energizes the electromagnets 21, 22 to be out of phase with the current energizing the field magnets 5. The operation of this device is practically identical with the operation of the apparatus shown in Fig. 1, wherein is embodied a magnetic device, instead of an electromagnetic, for controlling the armature 8.

It is well known in the art that before the ordinary electromagnetic relay attracts its armature, the magnetic field thereof must be built up to a point of saturation. Quite often this consumes more current than would be necessary with a device of the character described herein, which commences to move or operate its armature at a lower magnetic field density than the ordinary relay.

It is within the scope and spirit of this invention and intended to claim broadly the idea of having a magnet system, adapted to impart an ocillating movement to an armature controlled thereby, the movement of said armature being substantially synchronous with the wave of an alternating current used to energize said magnet system; and providing means for converting the oscillatory movement of said armature into the form of stored energy, which may be utilized to actuate a mechanical device.

What is claimed is:

1. In an electromagnetic device, an armature, means for causing said armature to oscillate, a movable member, means for producing a force, means for applying said force to said movable member to hold said member in alternate positions, and a flexible connecting means between said oscillating armature and said member adapted in the movement of said armature to overcome the resisting force upon said movable member, whereby said movable member will be moved from one position to the other with a positive and vigorous movement.

2. In an electromagnetic device, an armature, means for causing said armature to oscillate, a member movable to alternate positions, means for applying a magnetic force to said member to cause it to stick in whichever position it assumes, and a flexible connecting means between said armature and said member adapted in the movement of said armature to overcome the magnetic force, whereby said member will be snapped from one position to the other.

3. In an electromagnetic device, an armature, said armature being responsive to an alternating current, the oscillation of said armature being substantially synchronous with the wave of said alternating current, a second device including an armature suspended between a pair of pole pieces and in operative relation thereto, and a flexible member for connecting said armatures, said flexible member being given a torque which, at a certain point in the travel of said first mentioned armature, reaches a value sufficient to operate said second mentioned armature, whereby the movement of said second mentioned armature between its associated pole pieces is accomplished in a vigorous, positive manner.

4. In an electromagnetic device, a magnet system adapted to be energized by an alternating current, an armature controlled by said magnet system and adapted to oscillate substantially synchronously with the wave of the alternating current energizing said magnet system, a second device including an armature suspended between a pair of pole pieces and in operative relation thereto, and a flexible member for connecting said armatures, said flexible member being given a torque which, at a certain point in the travel of said first mentioned armature, reaches a value sufficient to operate said second mentioned armature, whereby the movement of said second mentioned armature between its associated pole pieces is accomplished in a vigorous, positive manner.

5. In an electromagnetic device, a magnet system adapted to be energized by an alternating current, an armature controlled by said magnet system and adapted to oscillate substantially synchronously with the wave of the alternating current energizing said magnet system, a second device including an armature suspended between the pole pieces of an electromagnet and in operative relation thereto, said electromagnet adapted to be energized by an alternating current of frequency the same as that energizing the first mentioned magnet system, and a flexible member for connecting said armatures, said flexible member being given a torque which is first opposed by the electromagnet acting upon the second mentioned armature, and at a certain point being aided by such electromagnet, at which point the movement of said second mentioned armature between its associated pole pieces is accomplished in a vigorous, positive manner.

It witness whereof I hereunto subscribe my name this 10th day of February, A. D. 1915.

JAMES BUCHNER SPEED.

Witnesses:
  E. EDLER,
  K. L. STAHL.